(12) United States Patent
Ichikawa

(10) Patent No.: US 8,616,299 B2
(45) Date of Patent: Dec. 31, 2013

(54) MOTOR CONTROL DEVICE, ELECTRIC POWER TOOL, AND RECORDING MEDIUM

(75) Inventor: Yoshitaka Ichikawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 405 days.

(21) Appl. No.: 13/013,125

(22) Filed: Jan. 25, 2011

(65) Prior Publication Data

US 2011/0186318 A1  Aug. 4, 2011

(30) Foreign Application Priority Data

Feb. 2, 2010  (JP) .................................. 2010-021279

(51) Int. Cl.
G05B 11/36  (2006.01)
(52) U.S. Cl.
USPC ................. 173/2; 173/176; 173/179; 173/217
(58) Field of Classification Search
USPC ............. 173/176, 2, 181, 182, 183, 178, 217, 173/179
See application file for complete search history.

(56) References Cited

U.S. PATENT DOCUMENTS

| 6,680,595 | B2 * | 1/2004 | Ito .................................. | 318/434 |
| 6,836,614 | B2 * | 12/2004 | Gilmore ......................... | 388/811 |
| 6,978,846 | B2 * | 12/2005 | Kawai et al. ...................... | 173/2 |
| 7,091,683 | B1 * | 8/2006 | Smith et al. .................... | 318/432 |
| 7,334,648 | B2 * | 2/2008 | Arimura ........................ | 173/179 |
| 7,464,769 | B2 * | 12/2008 | Nakazawa et al. ............. | 173/176 |
| 7,588,098 | B2 * | 9/2009 | Nakazawa et al. ............. | 173/176 |
| 7,708,085 | B2 * | 5/2010 | DeCicco et al. .............. | 173/176 |
| 7,770,658 | B2 * | 8/2010 | Ito et al. ............................. | 173/1 |
| 7,821,217 | B2 * | 10/2010 | Abolhassani et al. ......... | 318/432 |
| 7,861,796 | B2 * | 1/2011 | DeCicco et al. .................. | 173/1 |
| 7,882,900 | B2 * | 2/2011 | Borinato et al. .............. | 173/176 |
| 8,074,731 | B2 * | 12/2011 | Iwata et al. ........................ | 173/2 |

FOREIGN PATENT DOCUMENTS

| EP | 2 239 099 A2 | 10/2010 |
| JP | A 60-32592 | 2/1985 |
| JP | A 61-94104 | 5/1986 |
| JP | A 61-196786 | 8/1986 |
| JP | A-05-181536 | 7/1993 |
| JP | A-06-222807 | 8/1994 |
| JP | A 9-93971 | 4/1997 |
| JP | A-2001-103776 | 4/2001 |
| WO | WO 2008/069205 A1 | 6/2008 |

OTHER PUBLICATIONS

European Search Report issued in British Patent Application No. 1101383.6 dated May 25, 2011.
Aug. 7, 2013 Office Action issued in British Application No. GB1101383.6.
British Search Report issued in British Patent Application No. 1101383.6 dated May 25, 2011.

* cited by examiner

*Primary Examiner* — Scott A. Smith
(74) *Attorney, Agent, or Firm* — Oliff & Berridge, PLC

(57) ABSTRACT

A motor control device includes a target value setting unit, a measuring unit, a deviation calculating unit, a proportional control unit, an integral control unit, and a disabling unit. The deviation calculating unit calculates a deviation between a target value, set by the target value setting unit, and a measured value for rotational speed, measured by the measuring unit. The disabling unit disables proportional control, performed by the proportional control unit, when the deviation, calculated by the deviation calculating unit, is a value within a predetermined range.

9 Claims, 5 Drawing Sheets

MOTOR CONTROL DEVICE, ELECTRIC POWER TOOL, AND RECORDING MEDIUM

CROSS-REFERENCE TO RELATED APPLICATION

This application claims the benefit of Japanese Patent Application No. 2010-021279 filed on Feb. 2, 2010 in the Japanese Patent Office, the disclosure of which is incorporated herein by reference.

BACKGROUND

The present invention relates to controlling rotational speed of a motor installed in an electric power tool.

In one type of conventional electric power tools having a brushless DC (Direct Current) motor installed therein, in order to rotate a rotor of the motor, rotational positions of the rotor are detected based on electromotive force induced on each of a plurality of coils mounted in the motor. Then, rotational speed of the motor is calculated based on changes in detected rotational positions. The rotational speed of the motor is controlled by Proportional-Integral (PI) control such that the calculated rotational speed reaches target speed.

In such electric power tool, detection accuracy in rotational positions of a rotor is low, since the rotational positions of the rotor are not directly detected. Therefore, even when actual rotational speed of the motor is stabilized at target speed, calculated rotational speed may fluctuate. Due to the motor being controlled based on fluctuating calculated rotational speed, the rotation of the motor becomes unstable, thereby hunting or roaring noise of gears, on which driving force is applied from the motor, may be caused.

One of the conceivable solutions for such problem is disclosed in the Unexamined Japanese Patent Application Publication No. S61-094104. According to the control technique disclosed in this publication, a proportional gain is increased only when a deviation between calculated rotational speed and target speed is outside a predetermined range.

In an electric power tool to which such control technique is applied, although the rotational speed of the motor changes rapidly when the deviation is large, for example immediately after the motor of the electric power tool is started to be driven, change in the rotational speed of the motor becomes small when the deviation is small, for example when the rotational speed of the motor has reached to a vicinity of target speed.

SUMMARY

In the control technique described above, when a deviation is small, change in rotational speed of a motor becomes small. However, when calculated rotational speed fluctuates, an operation amount to the motor sensitively changes. Therefore, sufficiently inhibiting hunting or roaring noise of gears may be difficult.

One aspect of the present invention preferably provides a technique which allows an electric power tool to ensure follow-up ability in rotational speed of a motor to target speed and stabilize the rotational speed at the target speed, even when measured values of the rotational speed are not stable.

A motor control device in a first aspect of the present invention includes a target value setting unit, a measuring unit, a deviation calculating unit, a proportional control unit, an integral control unit and a disabling unit.

In this motor control device, the respective units works as follows: the target value setting unit sets a target value for rotational speed of a motor installed in an electric power tool; the measuring unit measures the rotational speed; the deviation calculating unit calculates a deviation between the target value, set by the target value setting unit, and a measured value for the rotational speed, measured by the measuring unit; the proportional control unit performs proportional control of the rotational speed such that the deviation, calculated by the deviation calculating unit, becomes zero; the integral control unit performs integral control of the rotational speed such that an integral value, obtained by integrating the deviation over time, becomes zero; and the disabling unit disables the proportional control, performed by the proportional control unit, when the deviation, calculated by the deviation calculating unit, is a value within a predetermined range.

In this motor control device, when a calculated deviation is a value within the predetermined range, the proportional control becomes disabled, but the integral control becomes enabled. Therefore, even when measured values of rotational speed fluctuate while the deviation is a value within the predetermined range, sensitive fluctuation in an operation amount to the motor can be inhibited, which in turn inhibits the rotational speed from being unstable.

When the deviation is a value outside the predetermined range, both the proportional control and the integral control become enabled. Therefore, the follow-up ability of the rotational speed to the target speed can be ensured. As described above, in an electric power tool having this motor control device installed therein, the follow-up ability of rotational speed of a motor to target speed can be ensured, and the rotational speed can be stabilized at the target speed, even when measured values of the rotational speed are not stable.

The disabling unit may select, from a plurality of predetermined ranges, each of which corresponds to at least one anticipated target value, the predetermined range that corresponds to the target value, set by the target value setting unit, and disable the proportional control, performed by the proportional control unit, when the deviation, calculated by the deviation calculating unit, is a value within the predetermined range.

In this case, if suitable ranges are predetermined in correspondence with anticipated target speeds, the proportional control can be appropriately disabled corresponding to target speed. The disabling unit may be configured in any manner so as to disable the proportional control.

For example, the disabling unit may be configured so as to set an operation amount of the proportional control, performed by the proportional control unit, to zero and disable the proportional control. In the case that the disabling unit is configured as above, the proportional control can be reliably disabled.

The motor may be any type of electric motor in which a rotor of the motor is rotated by supplied electric power. For example, if the motor is a brushless direct current motor having a rotor and a plurality of coils provided so as to rotate the rotor, the measuring unit may include an induced electromotive force detecting unit and a rotational speed calculating unit.

In this case, the induced electromotive force detecting unit detects electromotive force induced on each of the plurality of coils, and the rotational speed calculating unit calculates the rotational speed based on a detection result obtained by the induced electromotive force detecting unit. Due to such motor control device, even if a motor or an electric power tool is not provided with a sensor that directly detects rotational positions of a rotor, the follow-up ability of rotational speed to target speed can be ensured, and the rotational speed of the motor can be stabilized at the target speed.

An electric power tool in a second aspect of the present invention includes a motor that drives tool portion, a target value setting unit, a measuring unit, a deviation calculating unit, a proportional control unit, an integral control unit, and a disabling unit. In such electric power tool, the respective units works as follows: the target value setting unit sets a target value for rotational speed of the motor; the measuring unit measures the rotational speed; the deviation calculating unit calculates a deviation between the target value, set by the target value setting unit, and a measured value of the rotational speed, measured by the measuring unit; the proportional control unit performs proportional control of the rotational speed such that the deviation, calculated by the deviation calculating unit, becomes zero; the integral control unit performs integral control of the rotational speed such that an integral value, obtained by integrating the deviation over time, becomes zero; and the disabling unit disables the proportional control, performed by the proportion control unit, when the deviation, calculated by the deviation calculating unit, is a value within a predetermined range. Such electric power tool can exhibit the same effect as the motor control device in the first aspect.

A program in a third aspect of the present invention makes a computer perform a measuring step, a deviation calculating step, a proportional control step, an integral control step, and a disabling step. The computer measures, in the measuring step, rotational speed of a motor installed in an electric power tool, and calculates, in the deviation calculating step, a deviation between a target value for the rotational speed and a measured value of the rotational speed, measured in the measuring step. Subsequently, the computer performs proportional control of the rotational speed in the proportional control step such that the deviation, calculated in the deviation calculating step, becomes zero, and performs integral control of the rotational speed in the integral control step such that an integral value, obtained by integrating the deviation over time, becomes zero. When the deviation, calculated in the deviation calculating step, is a value within a predetermined range, the computer disables in the disabling step the proportional control in the proportional control step.

Due to this program, a computer can function as a part of the motor control device in the first aspect. It is to be noted that the above-described computer may be a known computer, or a computer suitably configured for an electric power tool.

The above-described program may be stored in a ROM or a back-up RAM which are incorporated in a computer, and loaded into the computer from the ROM or the back-up RAM for usage. Alternatively, the program may be loaded into a computer through a network and used.

Moreover, the above-described program may be recorded in a computer readable recording medium and used. Examples of such recording medium include a flexible disc (FD), a magnetooptic disc (MO), a DVD, a CD-ROM, a Blu-Ray disc, a HD-DVD, a hard disc, a portable semiconductor memory (such as a USB memory, a memory card, and so on).

BRIEF DESCRIPTION OF THE DRAWINGS

The invention will now be described below, by way of example, with reference to the accompanying drawings, in which.

DETAILED DESCRIPTION OF THE PREFERRED EMBODIMENTS

Figure 1:
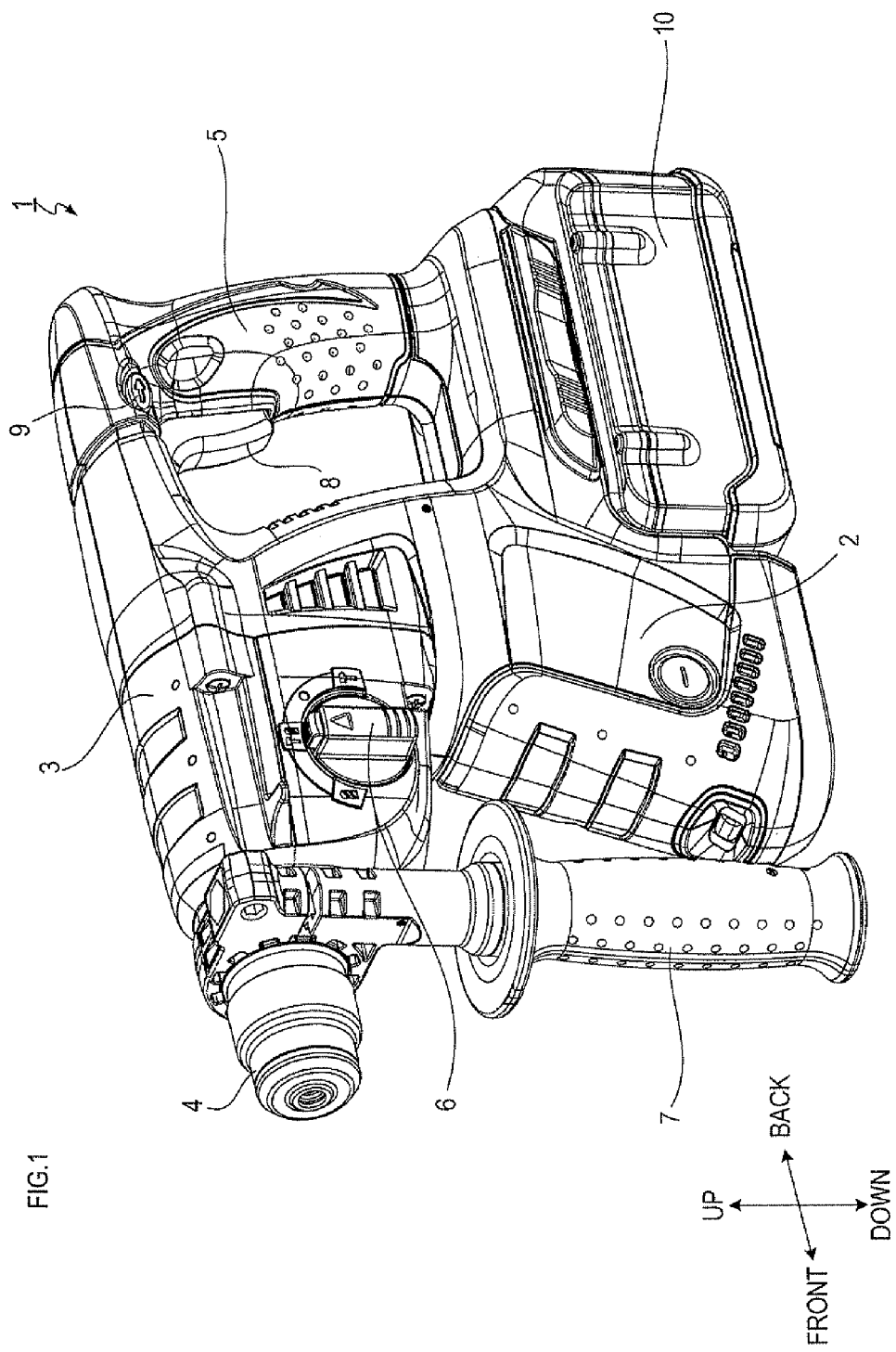
FIG. 1 is a perspective view showing an external appearance of an electric power tool according to the present invention.

As shown in FIG. 1, an electric power tool 1 according to the present embodiment is configured as a so-called hammer drill.

More specifically, the electric power tool 1 includes a motor housing 2, a gear housing 3 disposed above the motor housing 2, a drill chuck 4 disposed in front of the gear housing 3, and an operating portion 5 disposed behind the gear housing 3.

The motor housing 2 contains a driving motor M1 (see FIG. 2) that generates driving force for rotary driving the drill chuck 4. The gear housing 3 contains a gear mechanism (not shown) that transmits the driving force of the driving motor M1 to the drill chuck 4. The gear housing 3 is also provided with a mode changing switch 6 for a user of the electric power tool 1 to switch rotational operation modes of the drill chuck 4 (for example, rotation (drill) mode, hitting (hammer) mode and so on).

The drill chuck 4 is provided with an attachment mechanism (not shown) in a front end thereof to which a tool bit (not shown) can be detachably attached. Between the drill chuck 4 and the gear housing 3, a rod-shaped grip portion 7, extending in a downward direction of the electric power tool 1, is removably attached to the electric power tool 1. The grip portion 7 is configured in such a manner that the user can hold the grip portion 7 in one hand.

The operating portion 5 is configured in such a manner that the user can hold the operating portion 5 in the other hand. In the front side of the operating portion 5, a trigger switch 8 is provided for the user to drive/stop the driving motor M1. In the upper portion of the operating portion 5, a rotational direction changing switch 9 is provided so as to change the rotational direction (normal rotation/reverse rotation) of the driving motor M1. To the bottom end portion of the operating portion 5, a battery pack 10 is attached so as to be removable from the electric power tool 1.

Figure 2:
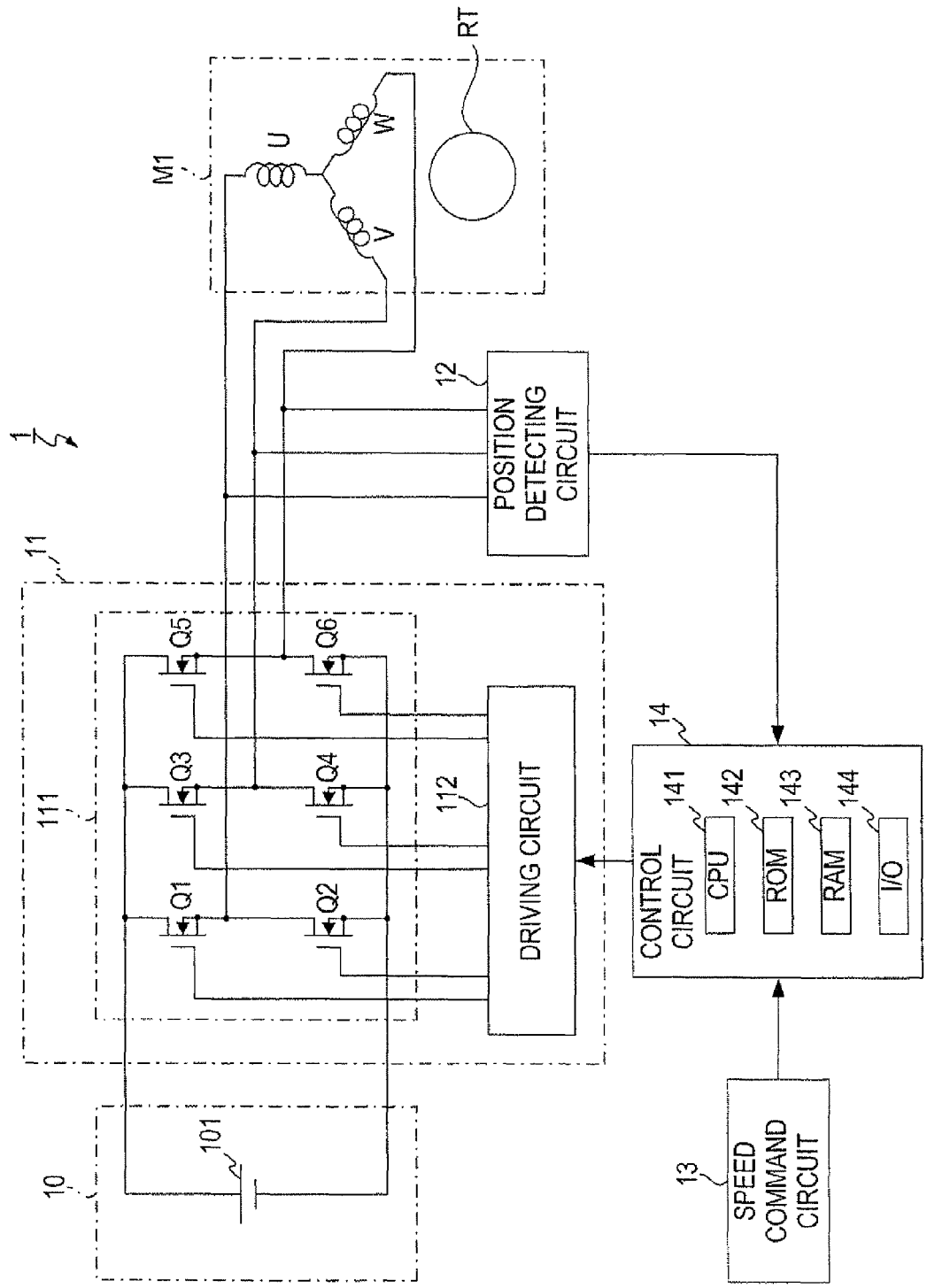
FIG. 2 is a block diagram showing an electrical configuration of the electric power tool.

As shown in FIG. 2, the electric power tool 1 is provided, in the interior thereof, with a battery cell 101, the driving motor M1, an inverter circuit 11, a position detecting circuit 12, a speed command circuit 13, and a control circuit 14.

The battery cell 101, illustrated as one cell in FIG. 2, is actually configured with a plurality of cells connected in series. The battery cell 101 is connected to the driving motor M1 via the inverter circuit 11, and also connected to at least one constant voltage power supply circuit (not shown). The at least one constant voltage power supply circuit supplies direct current power to the inverter circuit 11, the position detecting circuit 12, the speed command circuit 13, and the control circuit 14. The driving motor M1 is configured as a known brushless Direct Current (DC) motor. More specifically, the driving motor M1 is provided with a rotor RT including a plurality of (for example, two) permanent magnets (not shown), and three coils U, V, and W provided for rotating the rotor RT. Each of the coils U, V, and W is connected to one another at one end thereof (in the form of Y-connection). That is, the driving motor M1 is a three-phase brushless DC motor. It is to be noted that, although the rotor RT is illustrated outside of the coils U, V, and W in FIG. 2, the drawing simply shows the electric connection of the components, but not the structural disposition thereof.

The driving motor M1 according to the present embodiment is an inner-rotor type brushless DC motor, in which the rotor RT is disposed so as to be surrounded by the coils U, V, and W. Moreover, the driving motor M1 according to the present embodiment is configured as a so-called sensorless motor, and does not have a sensor (such as a Hall element) that directly detects rotational positions of the rotor RT.

The inverter circuit 11 is provided with a switching circuit 111 and a driving circuit 112. The switching circuit 111 is configured so as to turn on/off the power supply path from the battery cell 101 to the coils U, V, and W in the driving motor M1.

More specifically, the switching circuit 111 is provided with six switching elements Q1-Q6 each of which is a known FET. A pair of the switching elements Q1 and Q2 connected to each other in series, a pair of the switching elements Q3 and Q4 connected to each other in series, and a pair of the switching elements Q5 and Q6 connected to each other in series are connected to one another in parallel between a positive terminal and a negative terminal of the battery cell 101.

The other end of the coil U of the driving motor M1, which is not connected to other coils V and W, is connected between the switching elements Q1 and Q2. The other end of the coil V of the driving motor M1, which is not connected to other coils U and W, is connected between the switching elements Q3 and Q4. The other end of the coil W of the driving motor M1, which is not connected to other coils U and V, is connected between the switching elements Q5 and Q6.

The driving circuit 112 is configured so as to output PWM signals, having duty ratios corresponding to operation amount signals inputted from the control circuit 14, to respective gates of the switching elements Q1-Q6.

The position detecting circuit 12 is configured so as to, when the rotor RT of the driving motor M1 is rotated, detect a rotational position of the rotor RT based on electromotive force induced on each of the coils U, V and W, and to output rotational position signals, indicating the rotational position, to the control circuit 14.

The speed command circuit 13 is configured so as to output target speed signals, indicating a target value for the rotational speed (target speed) of the driving motor M1, corresponding to an operation amount of the trigger switch 8, to the control circuit 14.

The control circuit 14 is configured as a microcomputer, and includes at least a CPU 141, a ROM 142, a RAM 143, and an input/output (I/O) interface 144. In the control circuit 14, the CPU 141 executes various processes based on a variety of programs stored in the ROM 142, and controls each part of the electric power tool 1.

Figure 3:
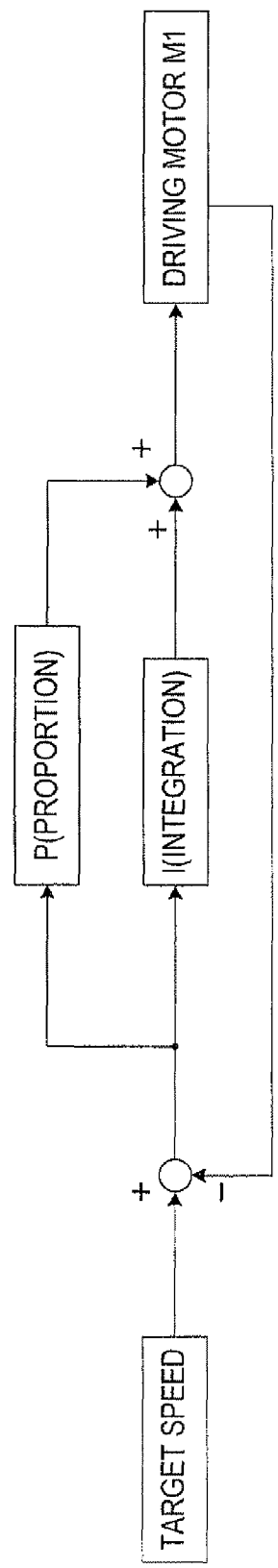
FIG. 3 is a block diagram showing a control system of the electric power tool.

Due to the above-described circuitry, a control system shown in FIG. 3 is implemented in the electric power tool 1. As shown in FIG. 3, in the control system of the electric power tool 1, an operation amount u(t) is given to the driving motor M1, which is obtained, as shown in the formula (1) below, by adding a proportional operation amount that is proportional to a deviation between the target speed and the rotational speed of the driving motor M1 and an integral operation amount obtained by integrating the deviation over time.

$$u(t) = K_P e(t) + K_I \int_0^t e(\tau) d\tau + u(0) \quad (1)$$

where
u(t) is operation amount,
e(t) is deviation,
$K_P$ is proportional gain,
$K_I$ is integral gain, and
u(0) is initial value for u(t).

The following specifically describes the process according to the present invention executed by the CPU 141.

Figure 4:
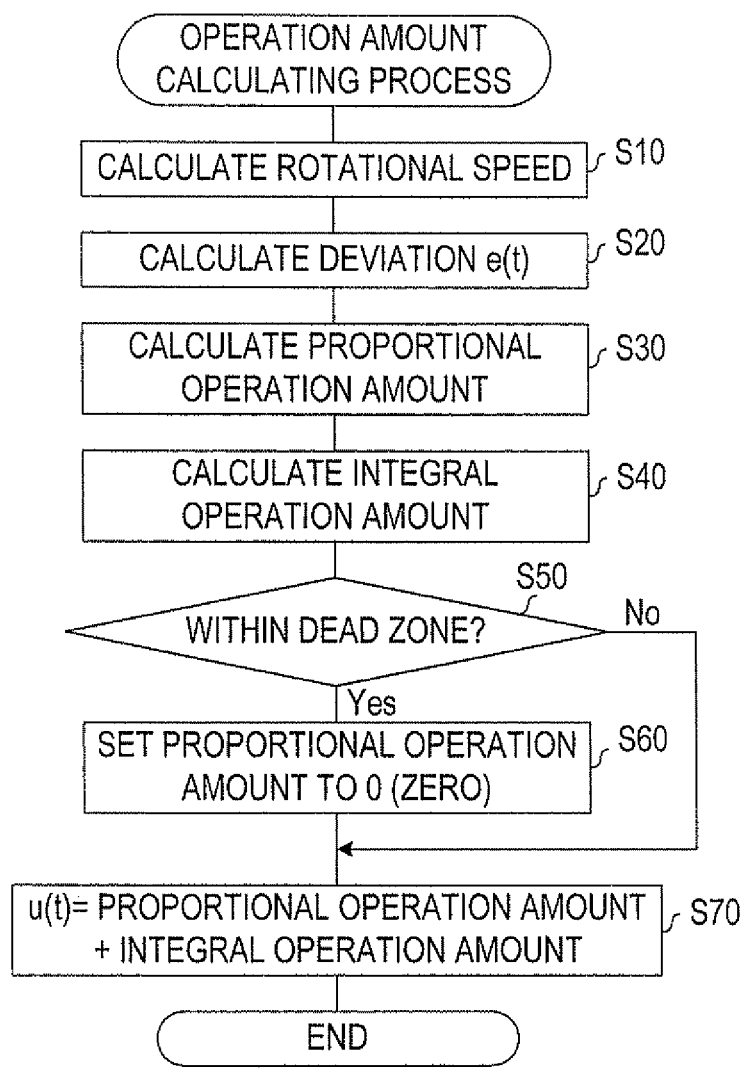
FIG. 4 is a flowchart illustrating a flow of an operation amount calculating process performed by a CPU of the electric power tool.

The CPU 141, when started up upon receiving power supply from the battery cell 101, repeats execution of an operation amount calculating process shown in FIG. 4. As shown in FIG. 4, in the present process, the CPU 141 calculates rotational speed of the driving motor M1 based on the rotational position signals inputted from the position detecting circuit 12 (S10), and calculates the deviation e(t) between the calculated rotational speed and the target speed inputted from the speed command circuit 13 (S20).

Subsequently, the CPU 141 calculates a proportional operation amount based on the calculated deviation e(t) and the preset proportional gain $K_P$ (S30), and calculates an integral operation amount based on the calculated deviation e(t) and the preset integral gain $K_I$ (S40).

The CPU 141 determines whether or not the calculated deviation e(t) is a value within a predetermined range (dead zone) where proportional control is disabled (S50). It is to be noted that, in the present embodiment, a plurality of dead zones, each of which covers a different appropriate range and corresponds to at least one anticipated target speed, is prestored in the ROM 142. Therefore, in S50, the CPU 141 selects one of the dead zones corresponding to the target speed inputted from the speed command circuit 13, and determines whether or not the calculated deviation e(t) is a value within the selected dead zone.

If the deviation e(t) is a value outside of the dead zone (S50: No), the process proceeds directly to S70, which will be explained later. If the calculated deviation e(t) is a value within the dead zone (S50: Yes), the proportional operation amount is set to zero ($K_P \cdot e(t)=0$) (S60), and the proportional control is disabled. Subsequently, the operation amount u(t) is calculated by adding the proportional operation amount and the integral operation amount (S70), and the above-described operation amount signals, indicating the operation amount u(t), are outputted to the driving circuit 112. Then, the present process is completed.

Figure 5:
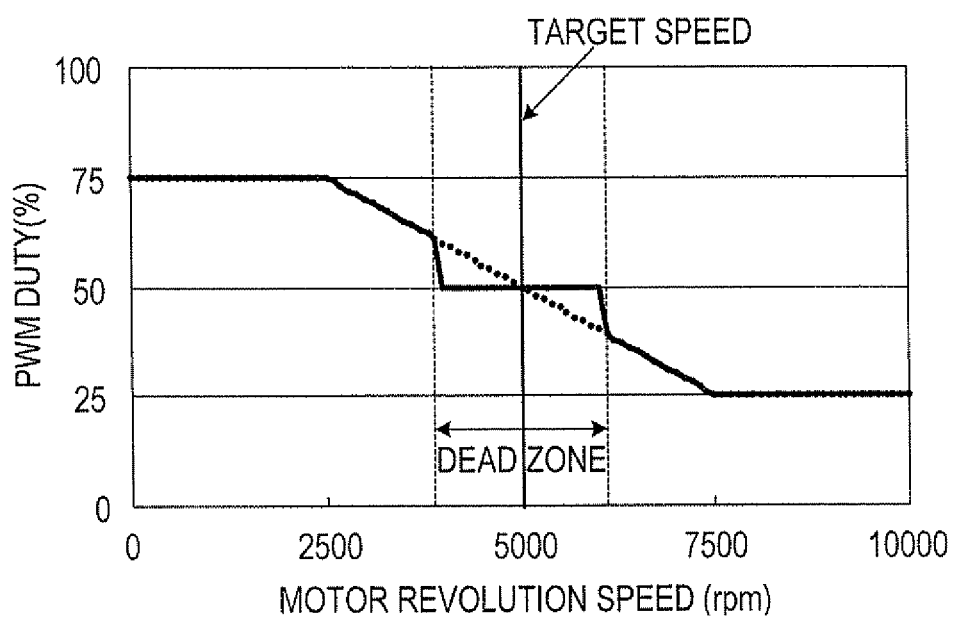
FIG. 5 is a graph illustrating an example of an action of the present invention.

The action of the operation amount calculating process is shown in FIG. 5. It is to be noted that, in FIG. 5, the target speed (target revolution speed) of the driving motor M1 is set to 5000 rpm, the initial duty ratio of PWM signals is set to 50%, the maximum and the minimum duty ratios of PWM signals are set respectively to 75% and 25%.

As shown in FIG. 5, the duty ratio of PWM signals according to the present embodiment changes proportionally, when the deviation e(t) is a value outside of the dead zone, due to the action of the proportional control. When the deviation e(t) is a value within the dead zone, the proportional control does not act, as shown with a bold dotted line, and the duty ratio is set to the initial duty ratio.

As described above, in the electric power tool 1 according to the present embodiment, when a calculated deviation e(t) is a value within a dead zone, the operation amount for the proportional control is set to zero, and the proportional control is ensured to become disabled. Therefore, even if calculated rotational speed fluctuates, while a deviation e(t) is a value within a dead zone, the operation amount u(t) to the driving motor M1 is inhibited from fluctuating drastically, which in turn inhibits the actual rotational speed of the driving motor M1 from being unstable.

When a calculated deviation e(t) is a value outside of a dead zone, the proportional control becomes enabled, and thus the follow-up ability of the rotational speed to the target speed is ensured. Therefore, in the electric power tool 1, the follow-up ability of the rotational speed of the driving motor M1 to the target speed is ensured, and, even when calculated rotational speed is not stable, the rotational speed can be stabilized at the target speed.

Moreover, in the electric power tool 1 according to the present embodiment, a plurality of dead zones is preset each of which corresponds to at least one anticipated target speed, and one of the dead zones corresponding to inputted target speed is selected. Therefore, the proportional control can be appropriately disabled corresponding to the target speed.

In the present embodiment, the speed command circuit 13 is one example of the target value setting unit according to the present invention, a set of the position detecting circuit 12 and the CPU 141 that executes S10 in the operation amount calculating process is one example of the measuring unit according to the present invention, the CPU 141 that executes S20 is one example of the deviation calculating unit according to the present invention, a set of the CPU 141 that executes S30 and S70 and the inverter circuit 11 is one example of the proportional control unit according to the present invention, a set of the CPU 141 that executes S40 and S70 and the inverter circuit 11 is one example of the integral control unit according to the present invention, and the CPU 141 that executes S50 and S60 is one example of the disabling unit according to the present invention.

Moreover, in the present embodiment, the position detecting circuit 12 is one example of the induced electromotive force detecting unit according to the present invention, and the CPU 141 that executes S10 is one example of the rotational speed calculating unit according to the present invention. Furthermore, in the present embodiment, S10 in the operation amount calculating process is one example of the measuring step according to the present invention, S20 is one example of the deviation calculating step according to the present invention, a set of S30 and S70 is one example of the proportional control step according to the present invention, a set of S40 and S70 is one example of the integral control step according to the present invention, and a set of S50 and S60 is one example of the disabling step according to the present invention. Although the above has described one embodiment of the present invention, the present invention is not limited to the above described embodiment, but may be embodied in various forms within the technical scope of the present invention.

For example, the present invention may be applied to an electric power tool other than a hammer drill. Moreover, the driving motor M1 may be configured as a brushed DC motor or an Alternating Current (AC) motor. In this case, the driving circuit needs to be modified so as to drive the brushed DC motor or the AC motor. Specific modifications are known to a person skilled in the art, therefore not explained here.

Moreover, the coils U, V, and W of the driving motor M1 may be connected in the form of Δ connection. Furthermore, the driving motor M1 may be configured as a two-phase brushless DC motor, or a brushless DC motor having four-phase windings or more.

Still furthermore, the driving motor M1 may be configured as an outer rotor type brushless DC motor in which a plurality of coils is disposed inside of a rotor. Moreover, the driving motor M1 may be provided with a sensor that directly detects rotational positions of the rotor RT of the driving motor M1 (such as Hall elements).

Furthermore, the transistors Q1-Q6 may be switching elements other than FETs (for example, bipolar transistors etc.) Still furthermore, the control circuit 14 may be an ASIC (Application Specific Integrated Circuits), a programmable logic device, such as FPGA (Field Programmable Gate Array), or a discrete circuit.

Moreover, the program for the operation amount calculating process may be recorded on a recording medium readable by the CPU 141 for usage. Examples of such recording medium include a flexible disc (FD), a magnetooptic disc (MO), a DVD, a CD-ROM, a Blu-Ray disc, a HD-DVD, a hard disc, and a portable semiconductor memory (for example, a USB memory, a memory card, and so on).

Moreover, Proportional Integral Derivative (PID) control may be used in the electric power tool 1. Furthermore, although a plurality of different dead zones corresponding to various target speeds is set in the electric power tool 1, only one dead zone may be alternatively set.

What is claimed is:

1. A motor control device comprising:
a target value setting unit that sets a target value for rotational speed of a motor installed in an electric power tool;
a measuring unit that measures the rotational speed;
a deviation calculating unit that calculates a deviation between the target value, set by the target value setting unit, and a measured value for the rotational speed, measured by the measuring unit;
a proportional control unit that performs proportional control of the rotational speed such that the deviation, calculated by the deviation calculating unit, becomes zero;
an integral control unit that performs integral control of the rotational speed such that an integral value, obtained by integrating the deviation over time, becomes zero; and
a disabling unit that disables the proportional control, performed by the proportional control unit, when the deviation, calculated by the deviation calculating unit, is a value within a predetermined range.

2. The motor control device according to claim 1, wherein the disabling unit selects, from a plurality of predetermined ranges each of which corresponds to at least one anticipated target value, the predetermined range that corresponds to the target value, set by the target value setting unit, and disables the proportional control, performed by the proportional control unit, when the deviation, calculated by the deviation calculating unit, is a value within the predetermined range.

3. The motor control device according to claim 1, wherein the disabling unit disables the proportional control by setting an operation amount for the proportional control, performed by the proportional control unit, to zero.

4. The motor control device according to claim 1, wherein the motor is a brushless direct current motor comprising:
a rotor; and
a plurality of coils provided so as to rotate the rotor, and wherein the measuring unit comprising:
an induced electromotive force detecting unit that detects electromotive force induced on each of the plurality of coils; and
a rotational speed calculating unit that calculates the rotational speed based on a detection result obtained by the induced electromotive force detecting unit.

5. The motor control device according to claim 1, wherein the predetermined range includes a value of zero.

6. An electric power tool comprising:
a motor that drives a tool portion;
a target value setting unit that sets a target value for rotational speed of the motor;
a measuring unit that measures the rotational speed;
a deviation calculating unit that calculates a deviation between the target value, set by the target value setting unit, and a measured value of the rotational speed, measured by the measuring unit;

a proportional control unit that performs proportional control of the rotational speed such that the deviation, calculated by the deviation calculating unit, becomes zero;

an integral control unit that performs integral control of the rotational speed such that an integral value, obtained by integrating the deviation over time, becomes zero; and a disabling unit that disables the proportional control, performed by the proportion control unit, when the deviation, calculated by the deviation calculating unit, is a value within a predetermined range.

7. The electric power tool according to claim 6, wherein the predetermined range includes a value of zero.

8. A non-transitory computer readable recording medium storing a program that makes a computer perform:

a measuring step in which rotational speed of a motor, installed in an electric power tool, is measured;

a deviation calculating step in which a deviation between a target value for the rotational speed and a measured value of the rotational speed, measured in the measuring step, is calculated;

a proportional control step in which the rotational speed is controlled according to proportional control such that the deviation, calculated in the deviation calculating step, becomes zero;

an integral control step in which the rotational speed is controlled according to integral control such that an integral value, obtained by integrating the deviation over time, becomes zero; and a disabling step in which the proportional control in the proportional control step is disabled, when the deviation, calculated in the deviation calculating step, is a value within a predetermined range.

9. The non-transitory computer readable recording medium according to claim 8, wherein the predetermined range includes a value of zero.

* * * * *